(12) United States Patent
Lee

(10) Patent No.: US 12,399,467 B2
(45) Date of Patent: Aug. 26, 2025

(54) BUILDING MANAGEMENT SYSTEMS AND METHODS FOR TUNING FAULT DETECTION THRESHOLDS

(71) Applicant: Tyco Fire & Security GmbH, Neuhausen am Rheinfall (CH)

(72) Inventor: Young M. Lee, Old Westbury, NY (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 831 days.

(21) Appl. No.: 17/540,725

(22) Filed: Dec. 2, 2021

(65) Prior Publication Data

US 2023/0152755 A1    May 18, 2023

Related U.S. Application Data

(63) Continuation-in-part of application No. 17/529,118, filed on Nov. 17, 2021, now Pat. No. 11,934,966.

(51) Int. Cl.
*G05B 13/04* (2006.01)
*G05B 13/02* (2006.01)
*G05B 15/02* (2006.01)

(52) U.S. Cl.
CPC .......... *G05B 13/0265* (2013.01); *G05B 15/02* (2013.01); *G05B 2219/2642* (2013.01)

(58) Field of Classification Search
USPC ........................................................ 700/275
See application file for complete search history.

(56) References Cited

U.S. PATENT DOCUMENTS

| | | |
|---|---|---|
| 5,301,109 A | 4/1994 | Landauer et al. |
| 5,446,677 A | 8/1995 | Jensen et al. |
| 5,581,478 A | 12/1996 | Cruse et al. |

(Continued)

FOREIGN PATENT DOCUMENTS

| | | |
|---|---|---|
| AU | 2019226217 A1 | 11/2020 |
| AU | 2019226264 A1 | 11/2020 |

(Continued)

OTHER PUBLICATIONS

Cronrath et al., "Enhancing Digital Twins through Reinforcement Learning," 2019 IEEE 15th International Conference on Automation Science and Engineering (CASE), 2019 (6 pages).

(Continued)

*Primary Examiner* — Emilio J Saavedra
(74) *Attorney, Agent, or Firm* — Foley & Lardner LLP

(57) ABSTRACT

Building management systems and methods for autonomously tuning rule thresholds are disclosed. In one aspect, the method includes a providing a rule including a threshold, the rule used to determine whether building equipment has a fault. The method further includes receiving a state of the building equipment, assessing using a machine learning model whether the determination of whether the building equipment has a fault is a false positive or a false negative based on the state and the threshold, determining a new threshold based on the assessment of the machine learning model, and replacing the threshold with the new threshold to make subsequent determinations of whether the building equipment or other building equipment has a fault.

18 Claims, 8 Drawing Sheets

(56) References Cited

U.S. PATENT DOCUMENTS

| | | |
|---|---|---|
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,817,383 B1 | 11/2017 | Sinha et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,514,963 B2 | 12/2019 | Shrivastava et al. |
| 10,515,098 B2 | 12/2019 | Park et al. |
| 10,521,968 B2 | 12/2019 | Locke et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,705,492 B2 | 7/2020 | Harvey |
| 10,708,078 B2 | 7/2020 | Harvey |
| 10,739,029 B2 | 8/2020 | Sinha et al. |
| 10,747,183 B2 | 8/2020 | Sinha et al. |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,901,373 B2 | 1/2021 | Locke et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,085,663 B2 | 8/2021 | Ellis et al. |
| 11,108,587 B2 | 8/2021 | Park et al. |
| 11,113,295 B2 | 9/2021 | Park et al. |
| 11,120,012 B2 | 9/2021 | Park et al. |
| 11,131,473 B2 | 9/2021 | Risbeck et al. |
| 11,210,591 B2 | 12/2021 | Alanqar et al. |
| 11,215,375 B2 | 1/2022 | Alanqar et al. |
| 11,229,138 B1 | 1/2022 | Harvey et al. |
| 11,243,503 B2 | 2/2022 | Przybylski et al. |
| 11,274,849 B2 | 3/2022 | Bell et al. |
| 11,276,125 B2 | 3/2022 | Pancholi et al. |
| 11,314,726 B2 | 4/2022 | Park et al. |
| 11,314,788 B2 | 4/2022 | Park et al. |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |

(56) References Cited

U.S. PATENT DOCUMENTS

| | | |
|---|---|---|
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2009/0271169 A1 | 10/2009 | Minto et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0107993 A1 | 4/2014 | Cheng |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2015/0379429 A1* | 12/2015 | Lee ............... G09B 5/00 706/11 |
| 2016/0011753 A1 | 1/2016 | McFarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0203036 A1* | 7/2016 | Mezic ............... G06F 11/0751 714/819 |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |

(56) References Cited

U.S. PATENT DOCUMENTS

| | | |
|---|---|---|
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0313561 A1 | 11/2018 | Sinha et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0017719 A1 | 1/2019 | Sinha et al. |
| 2019/0025771 A1 | 1/2019 | Park et al. |
| 2019/0026359 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0098113 A1 | 3/2019 | Park et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0139315 A1 | 5/2019 | Locke et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2019/0361411 A1 | 11/2019 | Park et al. |
| 2019/0361412 A1 | 11/2019 | Park et al. |
| 2019/0377306 A1 | 12/2019 | Harvey |
| 2020/0076196 A1 | 3/2020 | Lee et al. |
| 2020/0092127 A1 | 3/2020 | Park et al. |
| 2020/0133213 A1 | 4/2020 | Park et al. |
| 2020/0159182 A1 | 5/2020 | Goyal |
| 2020/0226156 A1 | 7/2020 | Borra et al. |
| 2020/0285203 A1 | 9/2020 | Thakur et al. |
| 2020/0313924 A1 | 10/2020 | Park et al. |
| 2020/0336328 A1 | 10/2020 | Harvey |
| 2020/0348632 A1 | 11/2020 | Harvey |
| 2020/0358794 A1* | 11/2020 | Vasseur ................. G06F 16/285 |
| 2020/0370771 A1 | 11/2020 | Alanqar et al. |
| 2020/0387576 A1 | 12/2020 | Brett et al. |
| 2020/0396208 A1 | 12/2020 | Brett et al. |
| 2021/0010351 A1 | 1/2021 | Sun et al. |
| 2021/0025612 A1 | 1/2021 | Sinha et al. |
| 2021/0042299 A1 | 2/2021 | Migliori |
| 2021/0043221 A1 | 2/2021 | Yelchuru et al. |
| 2021/0166548 A1* | 6/2021 | Ellam ................. G08B 21/182 |
| 2021/0182859 A1* | 6/2021 | Srinivasa Rao ... G06Q 20/4016 |
| 2021/0191826 A1 | 6/2021 | Duraisingh et al. |
| 2021/0208546 A1 | 7/2021 | Locke et al. |
| 2021/0240147 A1 | 8/2021 | Papadopoulos et al. |
| 2021/0258371 A1 | 8/2021 | Sundaresan |
| 2021/0325070 A1 | 10/2021 | Endel et al. |
| 2021/0342961 A1 | 11/2021 | Winter et al. |
| 2021/0344695 A1* | 11/2021 | Palani ..................... G06N 3/043 |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0156154 A1* | 5/2022 | Varnavas ............ G06F 11/3409 |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |
| 2023/0214555 A1 | 7/2023 | Harvey et al. |
| 2023/0252205 A1 | 8/2023 | Harvey et al. |
| 2023/0334200 A1 | 10/2023 | Meiners |

FOREIGN PATENT DOCUMENTS

| | | |
|---|---|---|
| CN | 101415011 A | 4/2009 |
| CN | 102136099 A | 7/2011 |
| CN | 102136100 A | 7/2011 |
| CN | 102650876 A | 8/2012 |

(56) References Cited

FOREIGN PATENT DOCUMENTS

| | | |
|---|---|---|
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| EP | 4 226 263 A1 | 8/2023 |
| JP | H10-049552 A | 2/1998 |
| JP | 3279078 B2 * | 4/2002 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/192770 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2018/204384 A1 | 11/2018 |
| WO | WO-2018/232147 A1 | 12/2018 |
| WO | WO-2019/018304 A1 | 1/2019 |
| WO | WO-2020/061621 A1 | 4/2020 |
| WO | WO-2021/163287 A1 | 8/2021 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

Ding et al., "MB2C Model-Based Deep Reinforcement Learning for Multi-zone Building Control," BuildSys '20, Virtual Event, Japan, Nov. 18-20, 2020 (pp. 50-59).
Gilles, P., "Graph Models for Systems-of-Systems Digital Twins," Orange Innovation, IT & Services, Meylan, FR, Jun. 2021 (8 pages).
International Search Report and Written Opinion on PCT No. PCT/US2022/050079 dated Mar. 28, 2023 (21 pages).
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 23, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
Ding et al., "MB2C Model-Based Deep Reinforcement Learning for Multi-zone Building Control," BuildSys '20, Virtual Event, Japan, Nov. 18-20, 2020 (10 pages).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, Ny, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).

(56) References Cited

OTHER PUBLICATIONS

Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Invitation to Pay Additional Fees and, Where Applicable, Protest Fee on PCT Appl. No. PCT/US2022/050079, dated Feb. 6, 2023 (17 pages).
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
PassiveLogic, "Explorer: Digital Twin Standard for Autonomous Systems. Made interactive." URL: https://passivelogic.com/software/quantum-explorer/, retrieved from internet Jan. 4, 2023 (13 pages).
PassiveLogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and PARK, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wang et al., "Linking energy-cyber-physical systems with occupancy prediction and interpretation through WiFi probe-based ensemble classification," Applied Energy, 2019, 236 (pp. 55-69).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Yao et al., "State of the art review on model predictive control (MPC) in Heating Ventilation and Air-conditioning (HVAC) field," Building and Environment, 2021, 200 (18 pages).
Zhou, Q. et al., "Knowledge-infused and Consistent Complex Event Processing over Real-time and Persistent Streams," Further Generation Computer Systems, 2017, 76 (pp. 391-406).
U.S. Appl. No. 17/529,118, filed Nov. 17, 2021.
U.S. Appl. No. 17/566,029, PassiveLogic, Inc.
U.S. Appl. No. 17/567,275, PassiveLogic, Inc.
U.S. Appl. No. 17/722,115, PassiveLogic, Inc.
Sjarov et al., "The Digital Twin Concept in Industry—A Review and Systemization," 2020 25th IEEE International Conference on Emerging Technologies and Factory Automation (EFTA), Sep. 8-11, 2020 (8 pages).

* cited by examiner

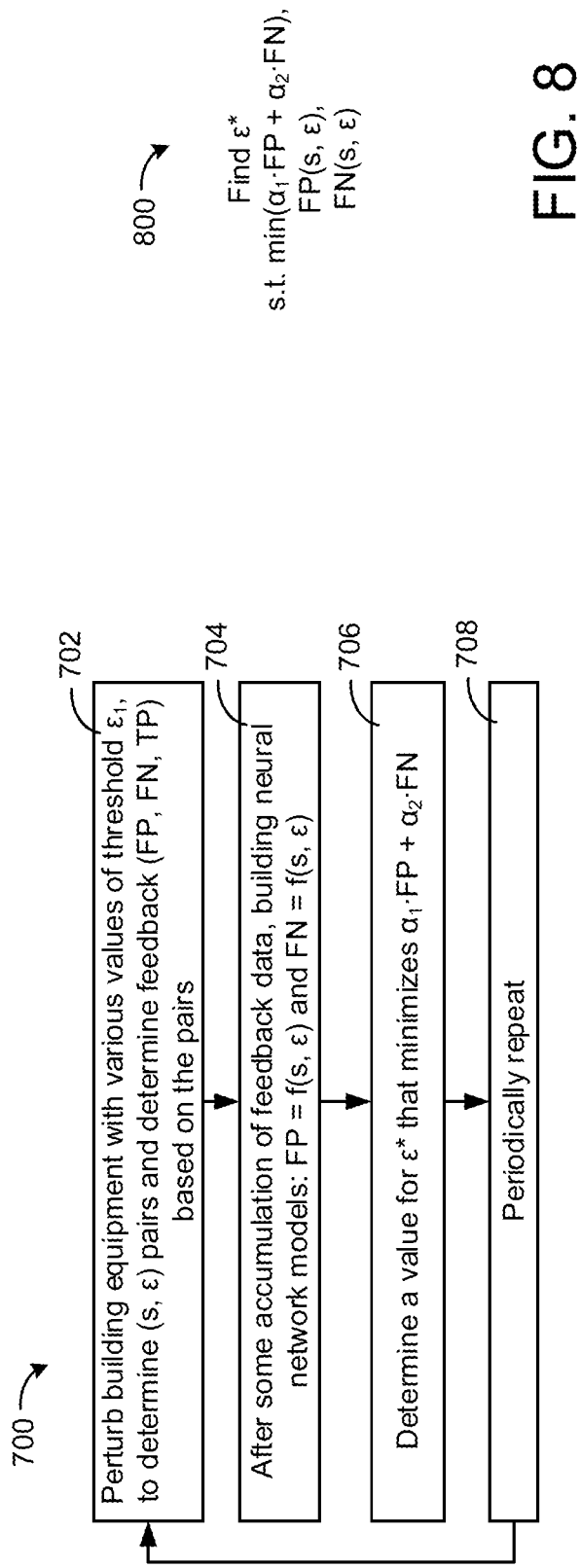

BUILDING MANAGEMENT SYSTEMS AND METHODS FOR TUNING FAULT DETECTION THRESHOLDS

CROSS-REFERENCE TO RELATED PATENT APPLICATIONS

The present application is a continuation-in-part of U.S. patent application Ser. No. 17/529,118, filed Nov. 17, 2021, which is incorporated herein by reference in its entirety.

BACKGROUND

This application relates generally to a building system of a building. This application relates more particularly to systems for tuning fault detection of the building system.

A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. Specifically, the present disclosure relates to a BMS with an equipment monitoring system to accurately determine whether the BMS is experiencing a fault.

SUMMARY

One inventive aspect is a non-transitory computer-readable storage medium having instructions stored thereon that, when executed by one or more processors, cause the one or more processors to provide a rule including a threshold, the rule used to determine whether building equipment has a fault. The instructions further cause the one or more processors to receive a state of the building equipment, assess, using a machine learning model, whether the determination of whether the building equipment has a fault is a false positive or a false negative based on the state and the threshold, determine a new threshold based on the assessment of the machine learning model, and replace the threshold with the new threshold to make subsequent determinations of whether the building equipment or other building equipment has a fault.

In some embodiments, the new threshold reduces a number of false positives a number of false negatives.

In some embodiments, the instructions further cause the one or more processors to accumulate training data for the machine learning model using the state and the threshold as inputs and labels of false positive or false negative as outputs.

In some embodiments, the rule includes a condition portion including a comparison of the state to the threshold and an action portion including a determination that the building equipment is faulty when the condition is satisfied or not faulty when the condition is not satisfied.

In some embodiments, the machine learning model includes a first machine learning model for predicting a false negative and a second machine learning model for predicting a false positive.

In some embodiments, the instructions further cause the one or more processors to perturb the building equipment with multiple values of the threshold to provide additional data for the machine learning model.

In some embodiments, the first machine learning model is configured to accurately predict false positives at a first rate, and the instructions further cause the one or more processors to retrain the first machine learning model when the first rate exceeds a first threshold rate.

In some embodiments, the second machine learning model is configured accurately predict false negatives at a second rate, and the instructions further cause the one or more processors to retrain the second machine learning model when the second rate exceeds a second threshold rate.

In some embodiments, the one or more processors are configured to use a constrained nonlinear optimization to determine the new threshold.

Another aspect is a method including providing, by a processing circuit, a rule including a threshold, the rule used to determine whether building equipment has a fault. The method includes receiving, by the processing circuit, a state of the building equipment, assessing, by the processing circuit using a machine learning model, whether the determination of whether the building equipment has a fault is a false positive or a false negative based on the state and the threshold, determining, by the processing circuit, a new threshold based on the assessment of the machine learning model, and replacing, by the processing circuit, the threshold with the new threshold to make subsequent determinations of whether the building equipment or other building equipment has a fault.

In some embodiments, the new threshold reduces a number of false positives a number of false negatives.

In some embodiments, accumulating, by the processing circuit, training data for the machine learning model using the state and the threshold as inputs and labels of false positive or false negative as outputs.

In some embodiments, the rule includes a condition portion including a comparison of the state to the threshold and an action portion including a determination that the building equipment is faulty when the condition is satisfied or not faulty when the condition is not satisfied.

In some embodiments, the machine learning model includes a first machine learning model for predicting a false negative and a second machine learning model for predicting a false positive.

In some embodiments, perturbing, by the processing circuit, the building equipment with multiple values of the threshold to provide additional data for the machine learning model.

In some embodiments, the first machine learning model is configured to accurately predict false positives at a first rate, and the method further includes retraining, by the processing circuit, the first machine learning model when the first rate exceeds a first threshold rate.

In some embodiments, the second machine learning model is configured accurately predict false negatives at a second rate, and the method further includes retraining, by the processing circuit, the second machine learning model when the second rate exceeds a second threshold rate.

In some embodiments, the method further includes using, by the processing circuit, a constrained nonlinear optimization to determine the new threshold.

Another aspect is a building system including one or more storage devices storing instructions thereon and one or more processors which execute the instructions causing the one or more processors to provide a rule used to determine whether a building equipment has a fault, perturb the building equipment having a plurality of states with a plurality of corresponding thresholds for the rule for determining whether a fault exists, determine whether a fault exists based on the perturbed building equipment, and receive feedback of whether the determination of whether a fault exists is a false positive or a false negative, or a true positive. The one or more processors further execute the instructions causing the one or more processors to provide training data to a machine learning model, the training data including the plurality of states and the plurality of corresponding thresholds as inputs and the feedback of false positive or false negative as outputs. The one or more processors further execute the instructions causing the one or more processors to receive a current state of the building equipment and a current threshold of the rule, assess, using the trained machine learning model, whether the determination of whether the building equipment has a fault is a false positive or a false negative based on the current state and the current threshold, determine a new threshold based on the assessment of the trained machine learning model, and replace the current threshold with the new threshold to make subsequent determinations of whether the building equipment or other building equipment has a fault.

In some embodiments, the instructions further cause the one or more processors to use constrained nonlinear optimization to find the new threshold that reduces a number of false positives a number of false negatives.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 7 is a flow diagram of a process for identifying values for the parameters of the threshold of FIG. 6, according to an exemplary embodiment.

FIG. 8 is an optimization algorithm that can be performed to identify the optimal threshold for the fault detection and diagnosis rule of FIGS. 6 and 7, according to an exemplary embodiment.

DETAILED DESCRIPTION

Overview

Figure 1:
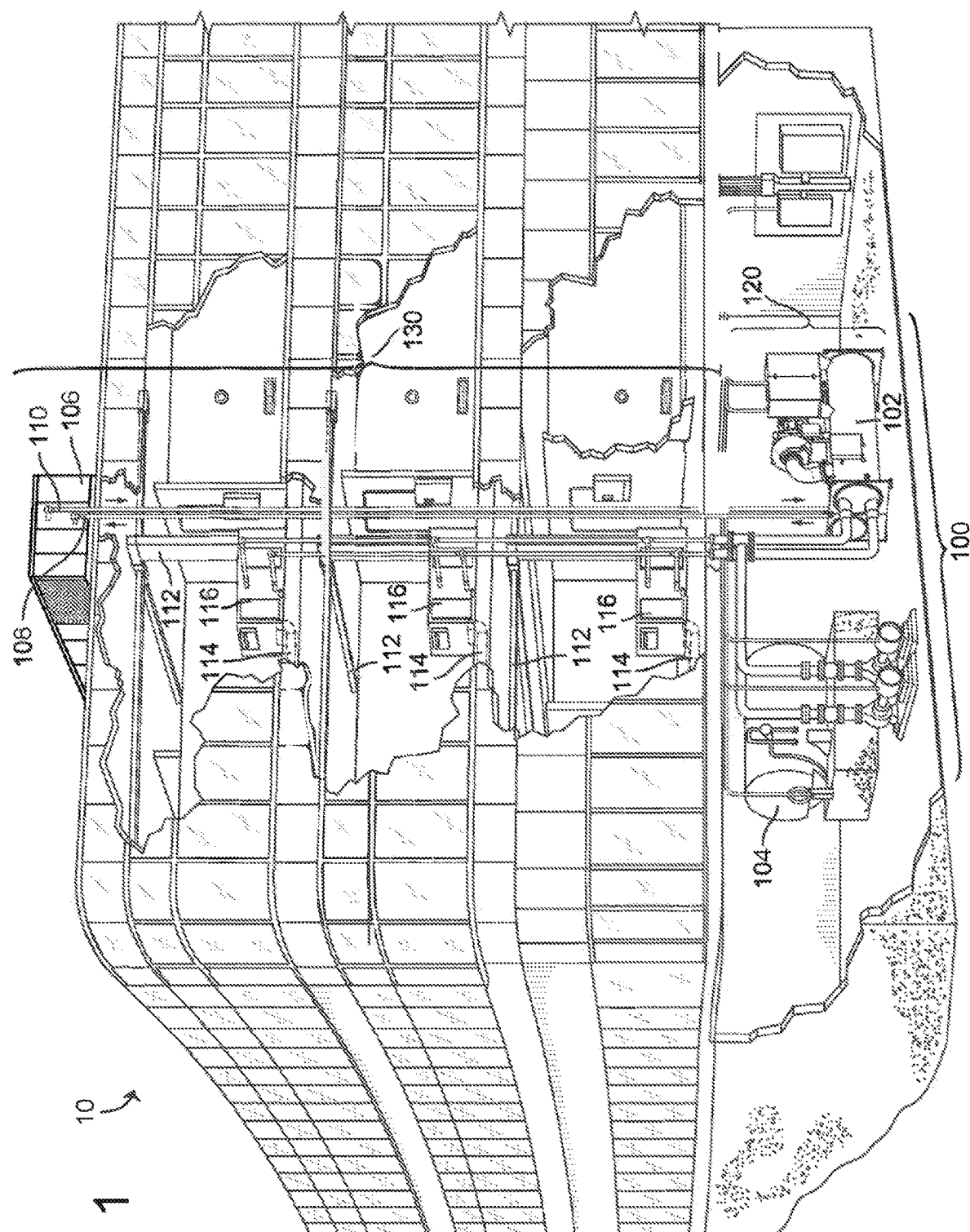
FIG. 1 is a drawing of a building equipped with a HVAC system, according to an exemplary embodiment.

Referring generally to the FIGURES, systems and methods for autonomous fault detection and diagnosis rule threshold tuning are shown, according to various exemplary embodiments. One method of detecting faults in buildings and their equipment is using rules to detect and diagnose faults. For example, when a building controller detects that a rule is satisfied, the building controller may determine that a subsystem pertaining to or associated with the rule has or may have a fault that should be adjusted and/or fixed.

A common technique of detecting faults in building equipment is using rules within building management systems (BMS). There may be one or more rules pertaining any particular building equipment (e.g., air handling unit, lighting equipment, etc.). Ideally the BMS will always correctly determine whether the building equipment is experiencing a fault or not. However, it is possible that the BMS determines that a fault exists even when the building equipment is operating normally (false positive), or that the BMS determines that a fault does not exist even when the building equipment does actually have a fault (false negative). When a fault is detected, the building manager may be notified by an alarm so that the building equipment may be inspected and/or a work order may be generated for a technician to fix the building equipment. This failure in accurate determination can lead to equipment failures, occupant discomfort and/or safety concerns, excessive costs, and waste.

Rules often include a condition portion and an action portion. When the condition portion is satisfied, the action portion may be executed. For example, there may be a rule for an air handling unit (AHU) that states, in the condition portion, that the supply air temperature is below a first threshold temperature and the fan speed of the AHU is greater than a second threshold rotations per minute (rpm). The rule may have an action portion that states that the AHU is at fault. In this rule, the condition portion is satisfied if both the supply air temperature is below the first threshold and the fan speed is greater than the second threshold, and the system can receive a determination that the AHU is faulty.

Rules are not always set for every condition and for every equipment. Accordingly, the rules may need to be adjust depending on operating conditions, equipment, occupants, etc. Further, the rules may need to be adjust because the equipment may degrade over time. If a threshold is too small, normal variation in operating conditions may result in false alarms, and if the threshold is too great, only a few extremely severe faults may be detected. Furthermore, manually adjusting or tuning thresholds is very difficult because of inaccuracies or overcompensation, which can lead to similar or different problems. Accordingly, there is a need to automatically tune the thresholds in rules.

In the present disclosure, systems and methods of automatically tuning the thresholds in rules are described. First, some data needs to be collected concerning the rules and whether the rules resulted in false positives or false negatives. The data can include the state of the building equipment, the threshold of the rule, and a determination of whether the rule resulted in a false positive or a false negative. This data can be provided as training data for a machine learning model or multiple models that can be trained to predict when a false positive or a false negative is going to occur based on the state and threshold. Once the model is trained, an optimization technique can be used to determine the optimal threshold level that minimizes the numbers of false positives and false negatives. The optimal threshold can then replace the existing threshold so that false positives and false negatives are minimized.

Building Management System Overview

Referring now to FIGS. 1-4, an exemplary building automation system (BAS) and HVAC system in which the systems and methods of the present invention can be implemented are shown, according to an exemplary embodiment. Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alarming system, any other system that is capable of managing building functions or devices, or any combination thereof.

The BAS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
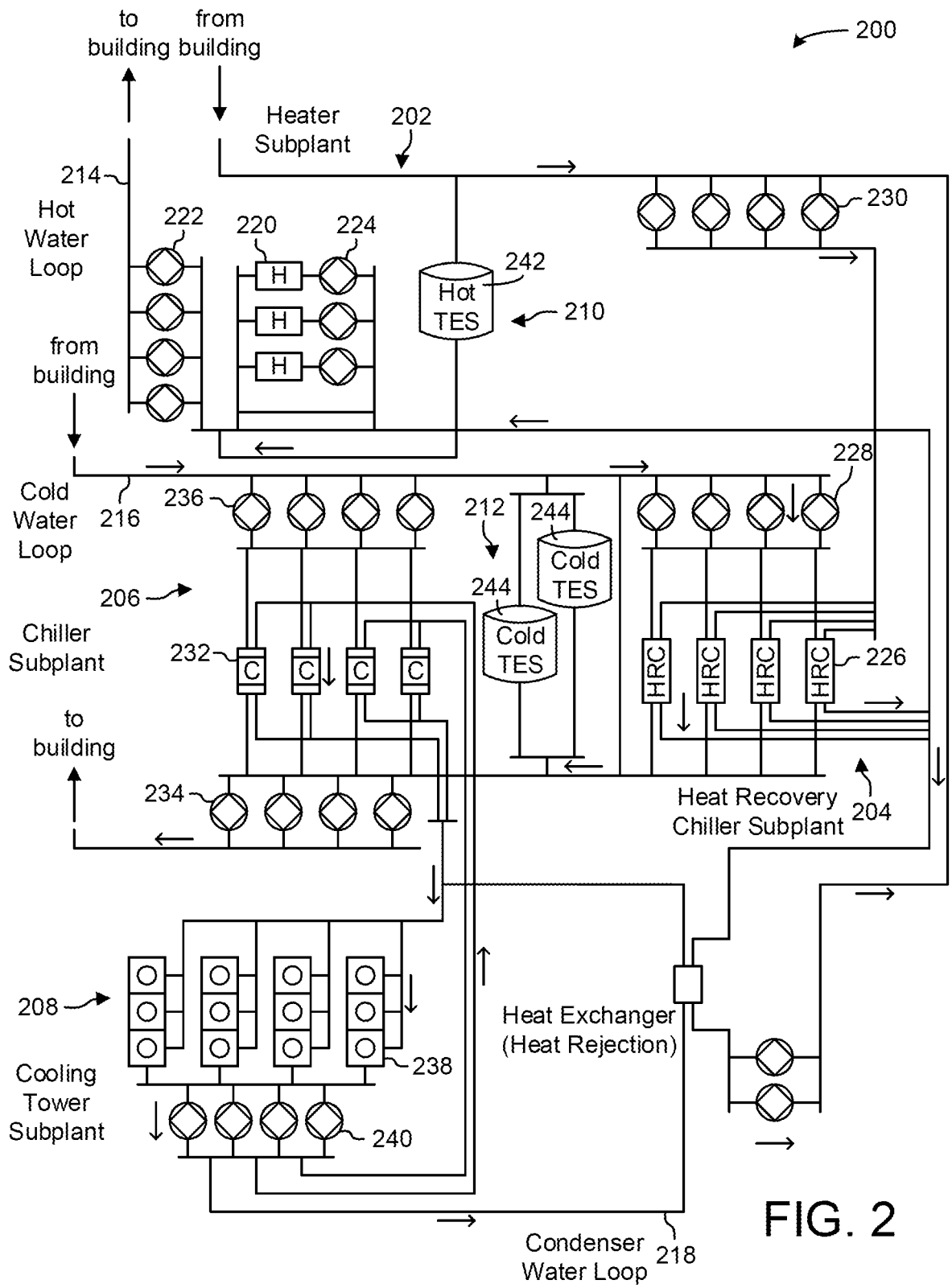
FIG. 2 is a block diagram of a waterside system that may be used in conjunction with the building of FIG. 1, according to an exemplary embodiment.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
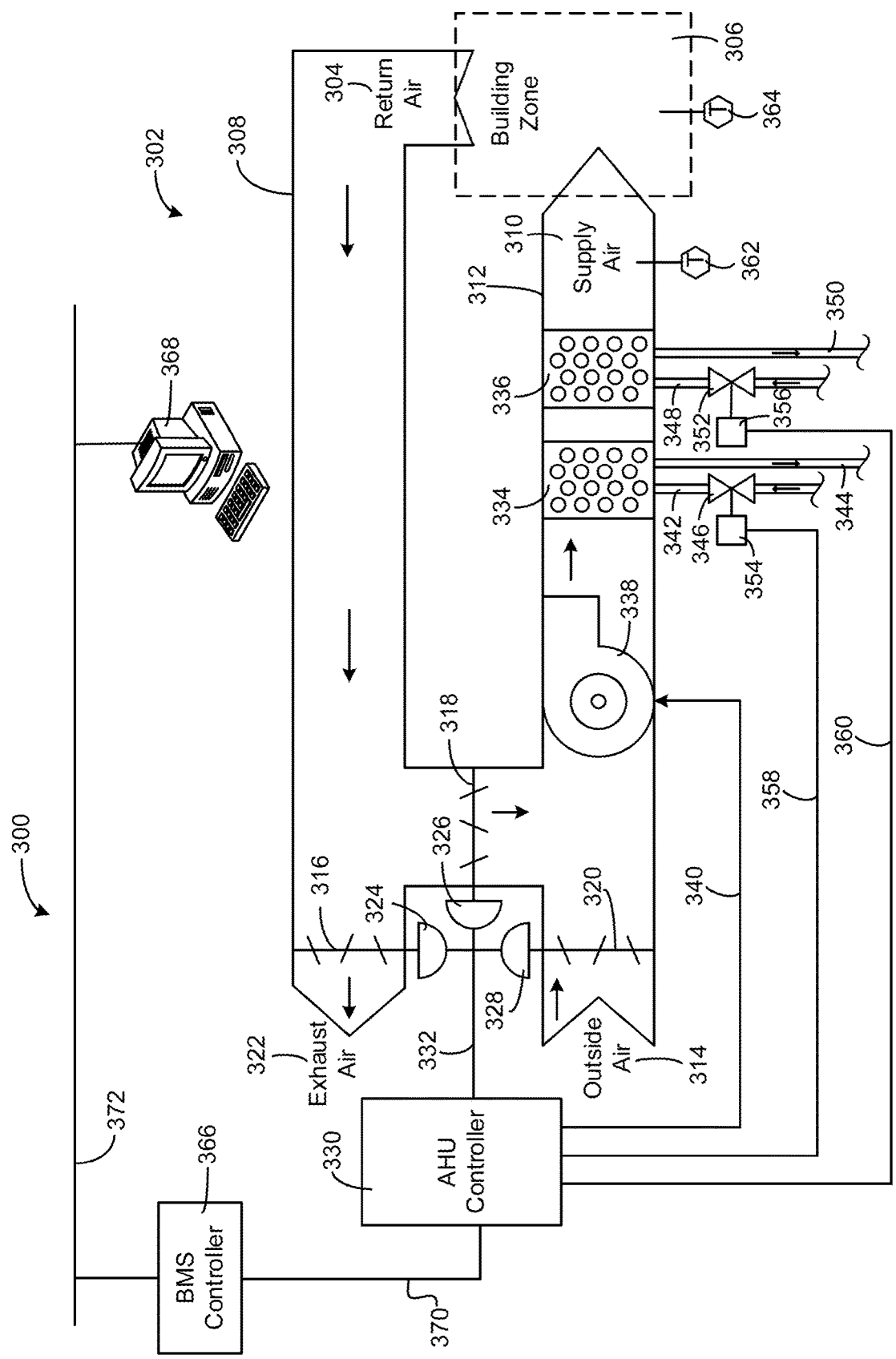
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 can be separate (as shown in FIG. 3) or integrated. In an integrated implementation, AHU controller 330 can be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 can provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BAS controller 366 and/or AHU controller 330 via communications link 372.

Figure 4:
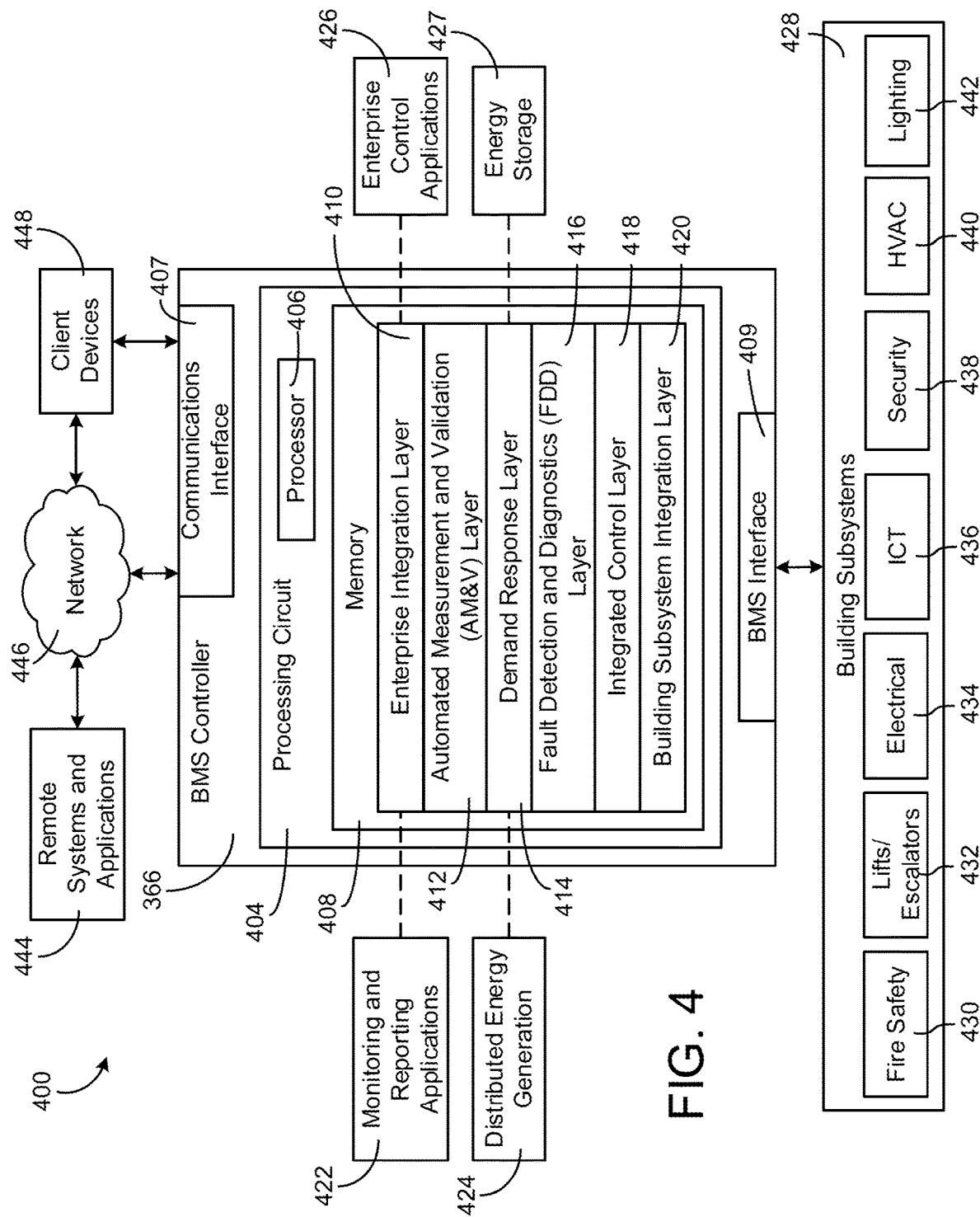
FIG. 4 is a block diagram of a building automation system (BAS) that may be used to monitor and/or control the building of FIG. 1, according to an exemplary embodiment.

Referring now to FIG. 4, a block diagram of a building automation system (BAS) 400 is shown, according to an exemplary embodiment. BAS 400 can be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 can facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 can also facilitate communications between BAS controller 366 and client devices 448. BAS interface 409 can facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 can be configured to manage communications between BAS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BAS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alarm a user to repair the fault before it becomes more severe.

Autonomous FDD Rule Threshold Tuning

Figure 5:
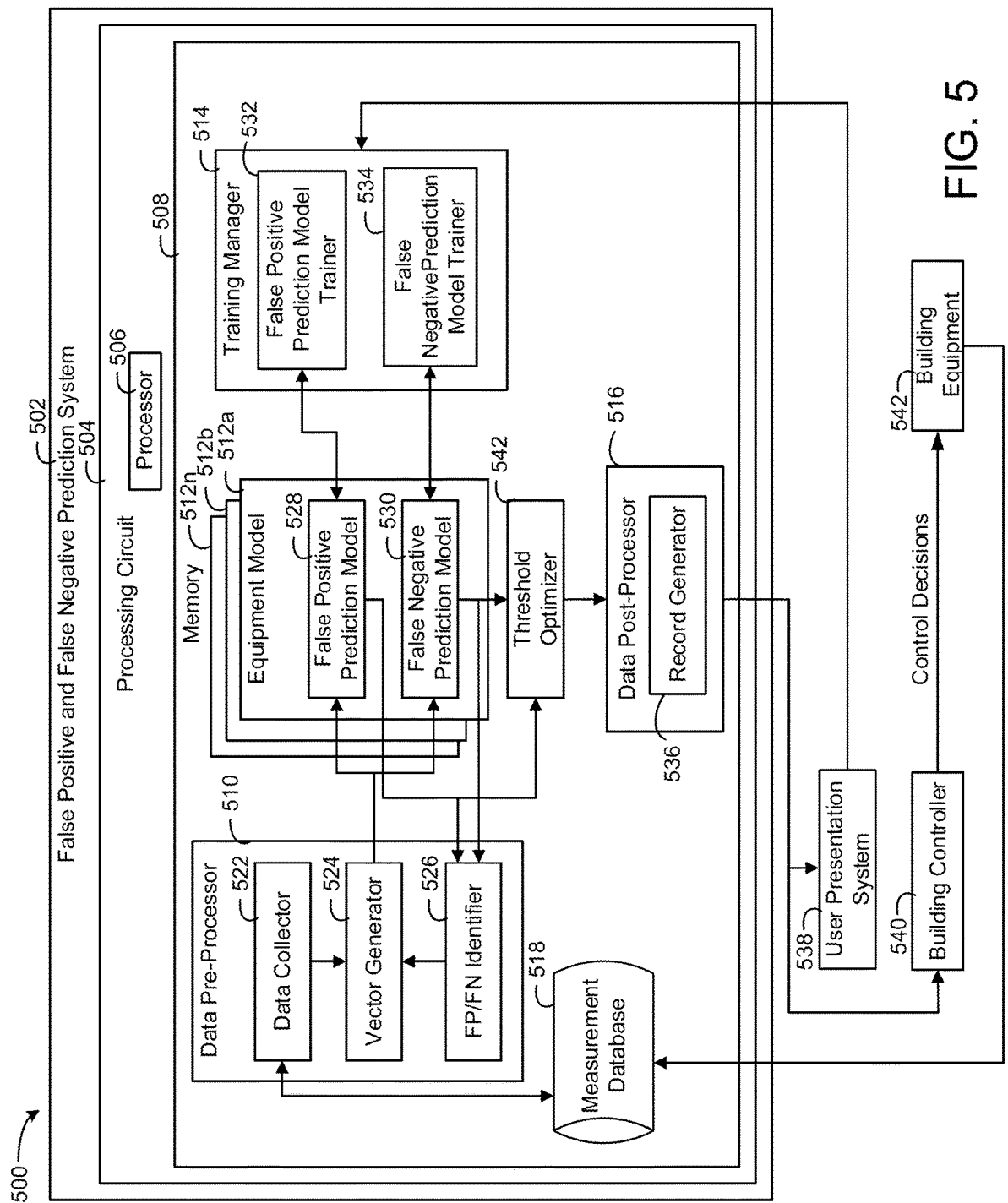
FIG. 5 is a block diagram of a system including a fault detection system, according to some embodiments.

Referring now to FIG. 5, a block diagram of a system 500 including a false positive and false negative prediction system 502 that is configured to predict false positives and false negatives of faults detected in building equipment by the FDD layer 416 in a building management system (e.g., BMS 400) is shown, according to an exemplary embodiment. False positive and false negative prediction system 502 may operate in a cloud environment or locally by a processor at the building management system. False positive and false negative prediction system 502 may implement one or more machine learning models to predict false positives and false negatives of faults that are detected in the building equipment. False positive and false negative prediction system 502 may do so by inputting measurements of various points of the piece of building equipment into the machine learning models and determining whether individual output confidence scores for false positives and false negatives from the models satisfy a predetermined criteria (e.g., exceed a predetermined threshold, is the highest predicted confidence score, etc.).

According to various example implementations of the present disclosure, the FDD layer 416 may determine that a building equipment has a fault based on the trigger or satisfaction of a rule. A false positive may indicate that the building equipment actually is not experiencing a fault, and the rule incorrectly determined that a fault has occurred. Furthermore, the FDD layer 416 may determine that a building equipment is not experiencing a fault because a state of the building did not satisfy the rule. A false negative may indicate that the building equipment is actually experiencing a fault, and the rule incorrectly determined that the fault did not occur. Although the false positive prediction model 528 is described in detail herein, similar description may apply for the false negative prediction model 530 except for false negatives instead of false positives.

As used herein, "points" or "data points" refer to sensor inputs, control outputs, control values, and/or different characteristics of the inputs and/or outputs. "Points" and/or "data points" may refer to various data objects relating to the inputs and the outputs such as BACnet objects. The objects may represent and/or include a point and/or group of points. The object may include various properties for each of the points. For example, an analog input may be a particular point represented by an object with one or more properties describing the analog input and another property describing the sampling rate of the analog input. For example, in some embodiments, a point is a data representation associated with a component of a BMS, such as a camera, thermostat, controller, VAV box, RTU, valve, damper, chiller, boiler, AHU, supply fan, etc.

System 500 may include a user presentation system 538, a building controller 540, and building equipment 542. Building controller 540 may be similar to or the same as BMS controller 366. False positive and false negative prediction system 502 may be a component of or be within building controller 540. In some embodiments, false positive and false negative prediction system 502 operates in the cloud as one or more cloud servers. Components 502 and 538-542 may communicate over a network (e.g., a synchronous or asynchronous network).

False positive and false negative prediction system 502 may include a processing circuit 504, a processor 506, and a memory 508. Processing circuit 504, processor 506, and/or memory 508 can be the same as, or similar to, processing circuit 404, processor 406, and/or memory 408, as described with reference to FIG. 4. Memory 508 may include a data pre-processor 510, equipment models 512a-n, a training manager 514, a data post-processor 516, and a measurement database 518. Memory 508 may include any number of components.

Data pre-processor 510 includes instructions performed by one or more servers or processors (e.g., processing circuit 504), in some embodiments. In some embodiments, data pre-processor 510 includes a data collector 522, a vector generator 524, and an FP/FN identifier 526. Data collector 522 may be configured to collect data that corresponds to different pieces of building equipment (e.g., building equipment 542). Data collector 522 can be configured to retrieve and/or collect building data from a building management system and store the building data in measurement database 518, in some embodiments. Data collector 522 can be configured to collect data automatically or, in some embodiments, poll sensors associated with building equipment 542 to collect data at predetermined time intervals set by an administrator. In some embodiments, data collector 522 can further be configured to collect data upon detecting that a value changed by an amount exceeding a threshold. In some embodiments, data collector 522 is configured to collect building data upon receiving a request from an administrator. The administrator may make the request from a client device. The administrator can request building data associated with any time period and building device.

In some embodiments, the data collector 522 may execute rules related to the building equipment and determine whether any rules have been satisfied. For example, a rule pertaining to the AHU may state that if the air supply temperature is less than a first threshold and if the fan speed is greater than a second threshold, the AHU has a fault. Accordingly, the data collector 522 may collect the measurements (e.g., air supply temperature and fan speed) from the measurement database 518 and determine whether any rule is satisfied such that a fault is determined to exist for the AHU. Then, the data collector 522 may provide the measurements, the thresholds, and the determination of whether there is a fault to the vector generator 524 so that a vector may be generated for the prediction models.

Data collector 522 may be configured to tag each data point of the data with timestamps indicating when the data point was generated and/or when data collector 522 collected the data point from the sensors. In some embodiments, data collector 522 can also tag the data with a device identifier tag indicating the building device from which the building data was collected. Thus, data collector 522 may store the timestamped data in measurement database 518 as a timeseries corresponding to how the measured values changed over time.

As described herein, timeseries can be a collection of values for a particular point (e.g., a discharge air temperature point of an air handling unit, a discharge air temperature, a supply fan status, a zone air temperature, a humidity, a pressure, etc.) generated at different times (e.g., at periodic intervals). The values may include or be associated with identifiers of the building devices with which the points are associated (e.g., an air handler, a VAV box, a controller, a chiller, a boiler, vents, dampers, etc.). Each timeseries can include a series of values for the same point and a timestamp for each of the data values. For example, a timeseries for a point provided by a temperature sensor (e.g., provided through local gateways) can include a series of temperature values measured by the temperature sensor and the corresponding times at which the temperature values were measured. An example of a timeseries which can be generated by data collector 522 is as follows:

[<key, timestamp1, value1>, <key, timestamp2, value2>, <key, timestamp3, value3>]

where key is an identifier of the source of the raw data samples (e.g., timeseries ID, sensor ID, device ID, etc.), timestampi may identify the time at which the ith sample was collected, and valuei may indicate the value of the ith sample.

Measurement database 518 may be a database configured to store building data associated with a building management system (e.g., BMS 400). Measurement database 518 can be a graph database, MySQL, Oracle, Microsoft SQL, PostgreSql, DB2, document store, search engine, device identifier-value store, etc. Measurement database 518 can be configured to hold data including any amount of values and can be made up of any number of components. The data can include various measurements and states (e.g., temperature readings, pressure readings, device state readings, blade speeds, etc.) associated with building equipment (e.g., AHUs, chillers, boilers, VAVs, fans, etc.) of the building management system. In some embodiments, the building data is tagged with timestamps indicating times and dates that the values of the building data were generated by devices (e.g., sensors) of the building management system or retrieved by data collector 522. It should be understood that, in some embodiments, measurement database 518 or any other type of data or data structure described herein may be or include a data structure configured to store digital twins of the building, building equipment, building spaces, building occupants/people, events, or any other entity of or related to the building. For example, measurement database 518 and/or other elements described herein may be implemented as a knowledge graph having nodes representing entities of the building and edges representing relationships between the entities. Example implementations of such digital twins and knowledge graphs as may be utilized in conjunction with the features of the present disclosure can be found in U.S. patent application Ser. No. 17/529,118, filed Nov. 18, 2021, which is incorporated herein by reference in its entirety.

In some embodiments, measurement database 518 may store setpoint values for different points of the building management system. The stored setpoint values may be associated with a schedule indicating the times in which building equipment 542 will operate so points of the building managements system will reach the corresponding stored setpoints. For example, a setpoint schedule may indicate that a kitchen should be 70 degrees at 7 P.M. but 68 degrees at 3 P.M. Accordingly, a controller (e.g., building controller 540) may control the building equipment of the building to cause the temperature point to reach the setpoint temperature at the corresponding times. Measurement database 518 may include schedules for setpoints of any point of the building to reach a desired level of comfort for the building's occupants.

Vector generator 524 may be configured to generate a feature vector that is configured to be input into machine learning models of equipment models 512a-n from measurement database 518. For example, the feature vector may include a state of the building equipment and a threshold that is used in the rule. For example, for an AHU of the building, there may be a rule that states if supply air temperature is less than a certain temperature and the fan speed is greater than a certain rpm, there is a fault with the AHU. This may rule may be expressed as follows:

if ($c_1 < \varepsilon_1$ & $c_2 > \varepsilon_2$),
then AHU has fault $F_1$ where $c_1$ corresponds to the supply air temperature, $\varepsilon_1$ corresponds to a first threshold, $c_2$ corresponds to the fan speed, $\varepsilon_2$ corresponds to a second threshold, and $F_1$ corresponds to the fault ID. For a first machine learning model, the state of the AHU may include the supply air temperature and the first threshold, and for a second machine learning model, the state of the AHU may include the fan speed and the second threshold. These pairs may be provided as feature vectors to the respective machine learning models.

Vector generator 524 may generate such feature vectors upon determining an event has occurred. An event may be or include a detection that a value associated with the piece of building equipment is above a threshold, a determination that a predetermined time interval has passed since vector generator 524 previously executed the machine learning model, receipt of a user input indicating to execute the machine learning model, receipt of a signal from another computing device indicating to execute the machine learning model, etc. Vector generator 524 may monitor various aspects of the building management system to identify such events and determine when the events occur. For example, vector generator 524 may keep track of the times in which vector generator 524 executes the machine learning model. Vector generator 524 may maintain an internal clock and identify when a predetermined (e.g., a pre-programmed) time period has passed since the last time vector generator 524 executed the machine learning model and determine the predetermined time period has passed. Vector generator 524 may identify an event as occurring upon determining the predetermined time period has passed.

Upon determining an event has occurred, vector generator 524 may generate a feature vector. Vector generator 524 may generate the feature vector by identifying the piece of building equipment that is associated with the event (e.g., the piece of building equipment that has a stored association with the event) and retrieve data that corresponds to the piece of building equipment. Vector generator 524 may retrieve the data that is associated with attributes or points of the piece of building equipment based on a stored association between the values and the attributes or points. Vector generator 524 may retrieve data that is associated with values from within a pre-configured time frame of the event (e.g., values that are associated with timestamps from a time frame before and/or after the event) and generate a feature vector using the retrieved values. Vector generator 524 may retrieve values that were collected from sensors of the building and/or values of setpoints that are stored in memory (e.g., measurement database 518).

Upon generating the feature vector, vector generator 524 may identify the machine learning model that is associated with the piece of building equipment that is associated with the event. Vector generator 524 may identify the machine learning model from equipment models 512a-n that each includes or is otherwise associated with a different false positive prediction model 528 and/or a false negative prediction model 530. Each of equipment models 512a-n may be a data representation of a different piece of building equipment within the building management system. The false positive prediction models and/or false negative prediction models of each equipment model 512a-n may be associated with a device identifier of the respective equipment model 512a-n. Vector generator 524 may identify, responsive to determining the identified event, false positive prediction model 528 and false negative prediction model 530 are associated with the same or an identical device identifier. Upon identifying false positive prediction model 528, vector generator 524 may apply the generated feature vector to false positive prediction model 528 and execute false positive prediction model 528.

False positive prediction model 528 may be a machine learning model (e.g., a neural network, a random forest, a support vector machine, etc.) configured to output confidence scores associated with a whether the satisfaction of a fault rule (e.g., determination that the building equipment has a fault) related to a building equipment was a false positive. False positive prediction model 528 may be configured to output confidence scores for fault determinations based on feature vectors that are generated by vector generator 524 based on data that corresponds to a particular piece of building equipment (e.g., the piece of building equipment that the equipment model represents). False positive prediction model 528 may output confidence scores for whether the determination that a fault has occurred in the building equipment is a false positive. FP/FN identifier 526 may identify the confidence scores and/or determine whether the determination of a fault in the piece of building equipment is a false positive in the future based on the confidence scores.

FP/FN identifier 526 may be configured to use a predetermined criteria to determine if and/or when a fault is likely to occur in a piece of building equipment. The predetermined criteria may be a threshold and/or one or more rules. For instance, FP/FN identifier 526 may determine a fault determination is a false positive by comparing the confidence score to a predetermined threshold. Responsive to determining the score exceeds the threshold, FP/FN identifier 526 may determine that the fault determination (e.g., the fact that there was a fault in the building equipment) is a false positive. However, responsive to determining the score does not exceed the threshold, the data processing system may determine that the fault determination is not likely a false positive (e.g., the fault is actually a true positive). The data processing system may compare the confidence score to any rule or threshold.

Upon determining a confidence score for a rule satisfied the predetermined criteria, FP/FN identifier 526 may identify the rule that was determined to have been satisfied and associated with the confidence score and an identification of the threshold in the rule that was used to determine the fault. In some embodiments, FP/FN identifier 526 may generate an alert indicating the fault did not occur in the building equipment and transmit the alert to a client device (e.g., an administrative device) so an administrator can view the alert and keep the building equipment operation/online. In some embodiments, FP/FN identifier 526 may feed the identification of the false positive back to vector generator 524, which in turn can use the identification to generate a new feature vector.

False negative prediction model 530 may be a machine learning model similar to false positive prediction model 528 that is configured to predict when false negatives occurred. False negative prediction model 530 may be configured to output confidence scores for fault determinations based on feature vectors that are generated by vector generator 524 based on data that corresponds to a particular piece of building equipment (e.g., the piece of building equipment that the equipment model represents). False positive prediction model 528 may output confidence scores for false positives and false negatives indicating likelihoods that the individual false positives and false negatives are the correct prediction.

Threshold optimizer 542 may receive the output confidence scores and process the scores to optimize the threshold that was used to determine the faults in the rules that were used in the false positive prediction model 528 and the false negative prediction model 530. The threshold optimizer 542 may use constrained nonlinear optimization to find the optimal threshold value (based on the accumulated data so far) that minimizes the number of false positives and false negatives.

Data post-processor 516 may receive the output confidence scores and the optimal threshold values and process the scores and thresholds to transmit a signal to user presentation system 538 and/or building controller 540 to adjust the threshold of the rules. Data post-processor 516 includes instructions performed by one or more servers or processors (e.g., processing circuit 504), in some embodiments. In some embodiments, data post-processor 516 includes a record generator 536. Record generator 536 may receive the predicted confidence scores and/or optimal threshold value and generate a record (e.g., a file, document, table, listing, message, notification, etc.) including confidence scores and/or the threshold values. Upon generating the record, record generator 536 may transmit the record to user presentation system 538 for display and/or building controller 540 to use to adjust operation or the configuration of building equipment 542 to avoid the false positive and false negative in the rule.

False positive and false negative prediction system 502 can provide indications of recommendations of how to adjust the threshold values to user presentation system 538 and/or building controller 540. In some embodiments, building controller 540 uses the expected recommendations to operate building equipment 542 (e.g., control environmental conditions of a building, cause generators to turn on or off, charge or discharge batteries, etc.). Further, user presentation system 538 can receive the indications and/or recommendations and cause a client device to display indications (e.g., graphical elements, charts, words, numbers, etc.) of the threshold values and/or recommendations. For example, user presentation system 538 may receive the rule and the optimal threshold value so that the user can modify the rule in the FDD layer 416.

In some embodiments, false positive and false negative prediction system 502 trains the prediction models of equipment models 512a-n using training manager 514. Training manager 514 includes instructions performed by one or more servers or processors (e.g., processing circuit 504), in some embodiments. In some embodiments, training manager 514 includes a false positive prediction model trainer 532 and/or a false negative prediction model trainer 534. False positive prediction model trainer 532 may be configured to train false positive prediction model 528 and other false positive prediction models of equipment models 512a-n to predict when false positives occur when a fault is detected for pieces of building equipment. False positive prediction model trainer 532 may feed labeled training data including measurements associated with points of a particular piece of building equipment to the false positive prediction model associated with the piece of building equipment. The respective false positive prediction model may output confidence scores for thresholds and false positive prediction model trainer 532 may determine differences between the predicted outputs and the labels and use back-propagation techniques according to a loss function to adjust the false positive prediction model's weights and parameters proportional to the determined differences. False positive prediction model trainer 532 may repeat these steps for any number of fault prediction machine learning models to train the machine learning models to predict future false positives for individual pieces of building equipment.

Similarly, false negative prediction model trainer 534 may be configured to train false negative prediction model 530 and other false negative prediction models of equipment models 512a-n. False negative prediction model trainer 534 may feed measurement data and/or identifications of false negatives to obtain confidence scores for the threshold in rules used in determining faults in the building equipment. False negative prediction model trainer 534 may identify labels indicating the correct output, determine differences between the correct output and the respective false negative prediction model's output, and use back-propagation techniques according to a loss function to adjust the false negative prediction model's weights and parameters according to the determined differences. False negative prediction model trainer 534 may repeat these steps for any number of false negative prediction models to the machine learning models to predict false negatives for individual pieces of building equipment. In some embodiments, false negative prediction model trainer 534 may train a false negative prediction model in real-time. In such embodiments, false negative prediction model trainer 534 may feed measurement data and/or identifications of false negatives into a false negative prediction model to obtain confidence scores for false negatives in a rule.

A user may input levels of accuracy (e.g., correct, incorrect, partially correct, etc.) of the recommendations and/or the predicted false positives or false negatives. False positive prediction model trainer 532 or false negative prediction model trainer 534 may identify the input levels of accuracy, determine differences between the predicted confidence scores and the input levels of accuracy, and use back-propagation techniques with the false negative prediction model that predicted the confidence scores for the false positives and false negatives according to a loss function based on the differences. Thus, false negative prediction model trainer 534 may train false negative prediction models in real-time or near real-time, in some embodiments.

In some embodiments, training manager 514 may operate in a cloud server and be configured to use training data from multiple building management systems to train false positive prediction models and/or false negative prediction models. Training manager 514 may be configured to train individual machine learning models using training data that is associated with multiple pieces of building equipment (e.g., building equipment of the same type) until the machine learning models are accurate to a threshold, and then deploy the machine learning models to the local building management system to be used to make predictions for individual pieces of building equipment (and be further trained based only on data associated with the piece of building equipment). This may be advantageous in building management systems that do not have enough training data to train machine learning models to make accurate predictions.

In such embodiments, training manager 514 may be configured to train the machine learning models using a weighting policy. The weight policy may include weights that can be applied to different training data sets. The weights may correspond to different building management systems and may be determined based on how trustworthy an administrator has determined data from a building management system to be and/or based on whether the data originated at a building management system for which the models are being trained. Training manager 514 may use the weights by weighting the differences in a loss function so that training data that is associated with higher weights cause higher shifts in the weights or parameters of a machine learning model than training data that is associated with lower weights during training. Thus, training manager 514 may control the training to improve the accuracy and speed with which machine learning models are trained to be employed at individual building management systems.

Figure 6:
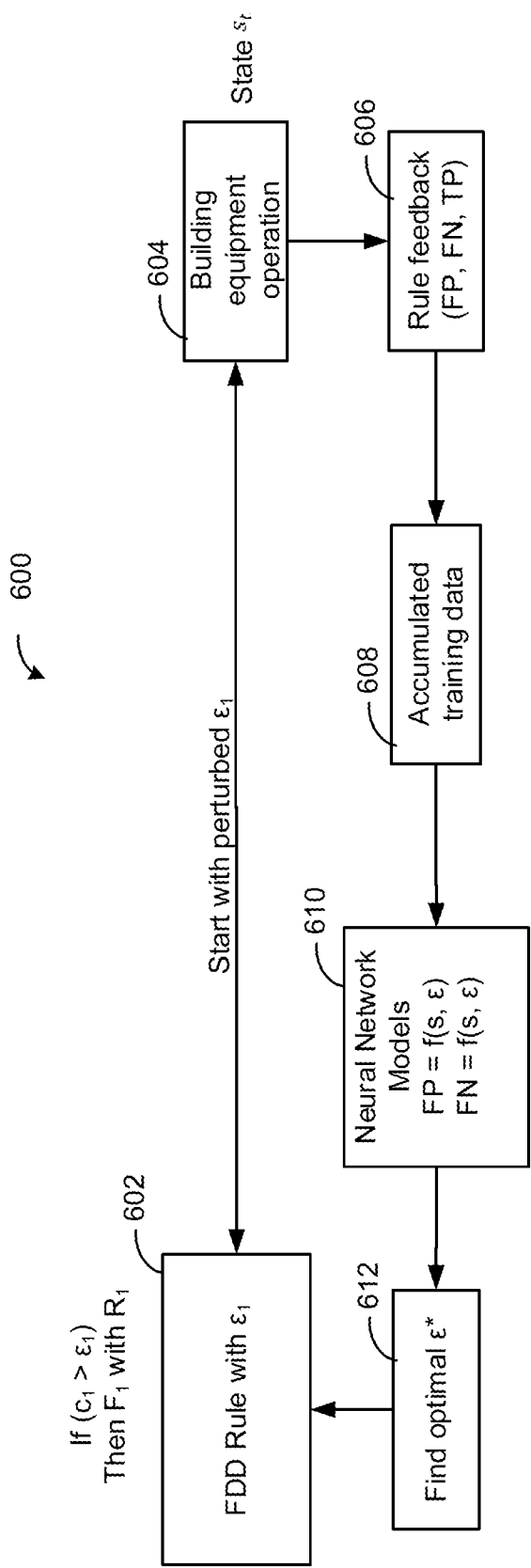
FIG. 6 is a block diagram of a system to find an optimal threshold of a fault detection and diagnosis rule, according to an exemplary embodiment.

Referring now to FIG. 6, a system 600 of a rule (or trigger rule) 602 of a building equipment where parameters of the trigger rule 602 are trained is shown, according to an exemplary embodiment. In some embodiments, the system 600 is similar to the system 400 or system 500. In the example described in FIG. 6 below, a simple rule for an AHU is described for the sake of clarity and brevity, but embodiments are not limited thereto, and the disclosed technology may be implemented for a variety of other building equipment and/or rules. For example, the building equipment may be related to fire safety 430, lifts/escalators 432, electrical 434, ICT 436, security 438, HVAC 440, lighting 442 or any other building equipment within or around buildings. Further, the rules may be related to any rule that is implemented within the FDD layer 416.

The system 600 can perturb parameters, $\varepsilon_1$ of the trigger rule 602. For example, the trigger rule 602 may include a rule that if supply air temperature is less than $\varepsilon_1°$ C., the rule is triggered (or satisfied), and a corresponding action be performed. The corresponding action can be a determination that a fault exists with the AHU. The perturbation of the parameters can be increasing or decreasing the parameters in set amounts from existing values. The perturbation of the parameters can be selecting a space of values for the parameters and/or randomizing the parameters and/or parameter space.

With the perturbed values for $\varepsilon_1$, the BMS controller 366 can simulate the state of the AHU for various temperatures within a range. The simulation can be performed by the false positive and false negative prediction system 502 via the models 512a-512n. The output of the models 512a-512n can be false positive or false negative.

The system 600 can analyze the states produced by the building equipment operation 604 to determine states of the building equipment. For example, the air supply temperature and fan speed can be generated and collected for each state. Furthermore, the state can be any metric that is collected from any portion of the building equipment. For example, the state can include supply air temperature, fan speed, AHU operating mode (heating, cooling with outdoor air, etc.), outside air temperature, zone temperature, zone humidity, etc. Once the state is collected, various rules may be calculated related to the building equipment to determine whether a fault exists.

The system 600 can receive feedback 606 from a user on whether the fault that was computed is a false positive, false negative, or true positive. As discussed above, false positive can imply that although a rule was satisfied to determine that a fault existed, there is no fault. False negative can imply that although the rule was not satisfied, and therefore no fault was detected, the building equipment in fact does have a fault. And a true positive can imply that the fault that was detected is true and no adjustment needs to be made to the rule.

The system 600 can generate accumulated training data 608. The accumulated training data can include the values of the parameters $\varepsilon_1$, the state of the building equipment for each value of the parameters, and the labeled data including whether the fault determination was a false positive, false negative, or true positive.

The system 600 can generate neural networks 610 for predicting whether the fault determination was a false positive or a false negative based on the state s and parameters $\varepsilon$. The neural networks 610 can be trained by the system 600 based on the accumulated training data 608.

The system 600 can then determine optimal values for the parameters $\varepsilon$. The system 600 can search a space of potential values for $\varepsilon$ that consider false positives and false negatives predicted by the trained neural network models 610. The optimization can be the relation 800 shown in FIG. 8. The optimization 612 performed by the system 600 can be a method of computing the optimal threshold of a trigger condition using the neural network models 610 of rewards and solving a constrained nonlinear optimization model. In some embodiments, the optimal values for the parameters found by the system 600 can be presented to a user for review and/or approval via a user interface, e.g., via the client device 368 or 448.

Referring now to FIG. 7, a process 700 for identifying values for the parameters of the trigger rule 602 of FIG. 6 is shown, according to an exemplary embodiment. The process 700 can be performed by the system 600 and/or any component of the system 600. Furthermore, the process 700 can be performed by any computing device described herein.

In step 702, the system 600 can perturb a building equipment with various values for thresholds $\varepsilon$. The result of the perturbed parameters can result in various states, s. The states can be states of the building equipment as described herein. The perturbations can result in pairs (s, $\varepsilon$) that can be used to determine feedback for false positive, false negative, or true positive.

In step 704, the system 600 can accumulate the pairs and corresponding feedback to create neural network models, e.g., the neural networks 610 based on the data determined in step 702. The neural networks 610 can predict false positive and false negative rewards as a function of the state and the threshold, e.g., FP=f(s,$\varepsilon$) and FN=f(s,$\varepsilon$).

In step 706, the system 600 can determine a value for the parameter, $\varepsilon$ that minimizes a relation, ($\alpha_1 \cdot$FP+$\alpha_2 \cdot$FN). The minimization is shown in relation 800 of FIG. 8. The values of $\alpha_1$ and $\alpha_2$ can weigh the various rewards in the relation that is minimized, e.g., the false positive and false negative reward.

In step 708, the system 600 can periodically repeat the steps 702-706. For example, the system 600 can repeat the steps at a defined time period (e.g., every day, week, month, etc.). In some embodiments, the retraining may occur if the rate of false positives and/or the rate of false negatives exceed an acceptable range set by the user. For example, if the user set the acceptable false positive rate to be 10% or lower, and the neural network model for false positives had a rate of 15%, the model may be retrained.

Figure 9:
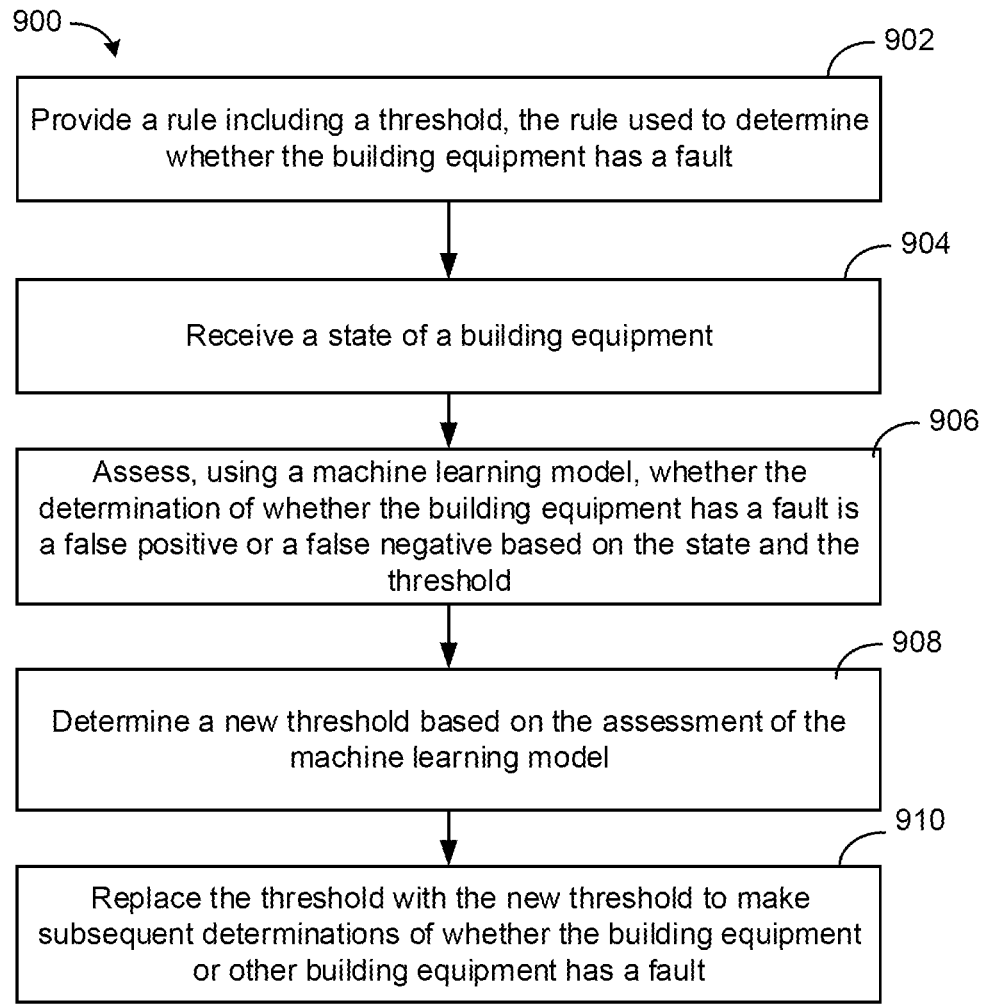
FIG. 9 is a flow diagram of a process for calculating the optimal threshold, according to an exemplary embodiment.

Referring now to FIG. 9, a process 900 of determining the optimal threshold for a rule (e.g., building equipment rule, trigger rule, or fault rule) is shown, according to an exemplary embodiment. The process 900 can be performed by the system 400, 500, or 600 and/or any of their components or a combination of the components. The process 900 can be performed by any computing device or processing circuit described herein. Furthermore, the process 900 may be include additional steps or certain steps may be removed depending on embodiments.

In step 902, the system can provide a rule including a threshold. The rule can pertain to any that is used by the FDD layer 416 to determine whether a fault exists within the building equipment or not. For example, if there is a rule that states if AHU mode is mechanical cooling with 100% outdoor air and the magnitude of the difference between outside air temperature and mixed air temperature is greater than a threshold, the AHU is faulty.

In step 904, the system can receive a state of the building equipment. In some embodiments, the state can include any or all values that are used to calculate whether a rule is satisfied or not. In the above example, the AHU running in a mode with mechanical cooling with 100% outdoor air, the outside air temperature, and mixed air temperature can all be part of the state of the AHU. Further, the threshold can be the value that is being optimized so that the system can reduce or minimize the number of false positives and false negatives.

In step 906, the system can assess, using a machine learning model, whether the determination of whether the building equipment has fault is a false positive or a false negative based on the state and the threshold. For example, if the above rule was satisfied, the system may determine that a fault exists in the AHU. However, in reality, the AHU may be operating normally and not have a fault as determined by occupants of the building or the building manager. Accordingly, the model's administrator may provide feedback to the system indicating that the fault is a false positive. In another example, the rule may not be satisfied and the system may then determine that the AHU does not have a fault. However, based on occupant or building manager feedback, it may be determined that the AHU is actually faulty, and the administrator may provide feedback to the system that there was a false negative.

In step 908, the system may determine a new threshold based on the assessment of the machine learning model. This may be done using constrained nonlinear optimization that solves for the minimal number of false positives and false negatives based on the feedback received in step 906. The new threshold may be higher or lower than the existing one, depending on the parameters set with the optimization equations. Further, the user may desire to reduce the number of false positives more than the false negatives, in which case the optimization parameters used in the equations may be adjust so that greater weight is given to minimizing the false positives. In other embodiments, the user may be interested in reducing the false negatives more than the false positives, in which case greater weight can be given to reducing the false negatives more than the false positives.

In step 910, the system may replace the threshold with the new threshold to make subsequent determinations of whether the building equipment or other building equipment has a fault. The number of false positives and false negatives may be reduced and/or minimized.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed:

1. A non-transitory computer-readable storage medium having instructions stored thereon that, when executed by one or more processors, cause the one or more processors to:
   provide a rule including a threshold, wherein the rule is used to generate a determination of whether building equipment has a fault;
   receive a state of the building equipment;
   perturb the building equipment with multiple values of the threshold to provide additional data for a machine learning model;
   generate, by the machine learning model, an assessment of whether the determination of whether the building equipment has a fault is a false positive or a false negative based on the state and the threshold;
   determine a new threshold based on the assessment of the machine learning model; and
   replace the threshold with the new threshold to make subsequent determinations of whether the building equipment or other building equipment has a fault.

2. The non-transitory computer-readable storage medium of claim 1, wherein the new threshold reduces a number of false positives a number of false negatives.

3. The non-transitory computer-readable storage medium of claim 1, wherein the instructions further cause the one or more processors to accumulate training data for the machine learning model using the state and the threshold as inputs and labels of false positive or false negative as outputs.

4. The non-transitory computer-readable storage medium of claim 1, wherein the rule includes:
   a condition portion including a comparison of the state to the threshold; and
   an action portion including a determination that the building equipment is faulty when the condition is satisfied or not faulty when the condition is not satisfied.

5. The non-transitory computer-readable storage medium of claim 4, wherein the machine learning model includes a first machine learning model for predicting a false negative and a second machine learning model for predicting a false positive.

6. The non-transitory computer-readable storage medium of claim 5, wherein the first machine learning model is configured to accurately predict false positives at a first rate, and wherein the instructions further cause the one or more processors to retrain the first machine learning model when the first rate exceeds a first threshold rate.

7. The non-transitory computer-readable storage medium of claim 5, wherein the second machine learning model is configured accurately predict false negatives at a second rate, and wherein the instructions further cause the one or more processors to retrain the second machine learning model when the second rate exceeds a second threshold rate.

8. The non-transitory computer-readable storage medium of claim 1, wherein the one or more processors are configured to use a constrained nonlinear optimization to determine the new threshold.

9. A method comprising:
   providing, by a processing circuit, a rule including a threshold, wherein the rule is used to generate a determination of whether building equipment has a fault;
   receiving, by the processing circuit, a state of the building equipment;
   perturbing, by the processing circuit, the building equipment with multiple values of the threshold to provide additional data for a machine learning model;
   generating, by the processing circuit and the machine learning model, an assessment of whether the determination of whether the building equipment has a fault is a false positive or a false negative based on the state and the threshold;
   determining, by the processing circuit, a new threshold based on the assessment of the machine learning model; and
   replacing, by the processing circuit, the threshold with the new threshold to make subsequent determinations of whether the building equipment or other building equipment has a fault.

10. The method of claim 9, wherein the new threshold reduces a number of false positives a number of false negatives.

11. The method of claim 9, wherein accumulating, by the processing circuit, training data for the machine learning model using the state and the threshold as inputs and labels of false positive or false negative as outputs.

12. The method of claim 9, wherein the rule includes:
a condition portion including a comparison of the state to the threshold; and
an action portion including a determination that the building equipment is faulty when the condition is satisfied or not faulty when the condition is not satisfied.

13. The method of claim 12, wherein the machine learning model includes a first machine learning model for predicting a false negative and a second machine learning model for predicting a false positive.

14. The method of claim 13, wherein the first machine learning model is configured to accurately predict false positives at a first rate, and wherein the method further comprises retraining, by the processing circuit, the first machine learning model when the first rate exceeds a first threshold rate.

15. The method of claim 13, wherein the second machine learning model is configured accurately predict false negatives at a second rate, and wherein the method further comprises retraining, by the processing circuit, the second machine learning model when the second rate exceeds a second threshold rate.

16. The method of claim 9, further comprising using, by the processing circuit, a constrained nonlinear optimization to determine the new threshold.

17. A building system comprising:
one or more storage devices storing instructions thereon; and
one or more processors, wherein the one or more processors execute the instructions causing the one or more processors to:
provide a rule used to generate a determination of whether a building equipment has a fault;
perturb the building equipment having a plurality of states with a plurality of corresponding thresholds for the rule for determining whether a fault exists;
determine whether a fault exists based on the perturbed building equipment;
receive feedback of whether the determination of whether a fault exists is a false positive or a false negative, or a true positive;
provide training data to a machine learning model, wherein the training data includes the plurality of states and the plurality of corresponding thresholds as inputs and the feedback of false positive or false negative as outputs;
receive a current state of the building equipment and a current threshold of the rule;
generate, by the trained machine learning model, an assessment of whether the determination of whether the building equipment has a fault is a false positive or a false negative based on the current state and the current threshold;
determine a new threshold based on the assessment of the trained machine learning model; and
replace the current threshold with the new threshold to make subsequent determinations of whether the building equipment or other building equipment has a fault.

18. The building system of claim 17, wherein the instructions further cause the one or more processors to use constrained nonlinear optimization to find the new threshold that reduces a number of false positives a number of false negatives.

* * * * *